US012621053B2

(12) United States Patent
Van Wageningen et al.

(10) Patent No.: US 12,621,053 B2
(45) Date of Patent: May 5, 2026

(54) SYNCHRONIZATION IN OPTICAL WIRELESS NETWORKS FOR INTERFERENCE SUPPRESSING

(71) Applicant: SIGNIFY HOLDING B.V., Eindhoven (NL)

(72) Inventors: Andries Van Wageningen, Wijlre (NL); Karnekumar Arulandu, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 929 days.

(21) Appl. No.: 17/766,665

(22) PCT Filed: Sep. 29, 2020

(86) PCT No.: PCT/EP2020/077174
§ 371 (c)(1),
(2) Date: Apr. 5, 2022

(87) PCT Pub. No.: WO2021/069254
PCT Pub. Date: Apr. 15, 2021

(65) Prior Publication Data
US 2024/0056183 A1 Feb. 15, 2024

(30) Foreign Application Priority Data

Oct. 8, 2019 (EP) .................................... 19201936

(51) Int. Cl.
*H04B 10/00* (2013.01)
*H04B 10/112* (2013.01)
(Continued)

(52) U.S. Cl.
CPC ............ *H04B 10/112* (2013.01); *H04J 14/08* (2013.01)

(58) Field of Classification Search
CPC ... H04B 10/11; H04B 10/112; H04B 10/1123; H04B 10/1125; H04B 10/1129;
(Continued)

(56) References Cited

U.S. PATENT DOCUMENTS 8,432,887 B1 4/2013 Ding
9,615,302 B2 4/2017 Zhi et al.
(Continued)

FOREIGN PATENT DOCUMENTS

KR 101009614 B1 1/2011

OTHER PUBLICATIONS

Qiang, et al., "General Considerations and Proposals for High Rate PD Communications", IEEE, vol. 802.15.7rl, No. 1, Jan. 13, 2016, pp. 1-15.
(Continued)

*Primary Examiner* — Daniel G Dobson

(57) ABSTRACT

In an optical wireless communication, OWC, network (100), time division multiple access, TDMA, is commonly used for interference suppression among multiple network devices (D1-Dn) associated to a single coordinator, or among adjacent coordinators (C1-Cn). However, an offset of MAC cycles among two adjacent coordinators (C1-C2) may still result in interference to a network device (D1) located in the overlapping area of the coverage areas of these two adjacent coordinators (C1-Cn). This invention is directed to various methods, apparatus, systems, computer program and computer-readable media for providing a mechanism to make use of an out-of-band channel to send a signal from a network device (D1) to the two adjacent coordinators (C1-C2), for assisting the alignment of MAC cycles among the two adjacent coordinators (C1-C2), and the out-of-band channel has a line-of-sight character, and is out-of-band as compared to the OWC network (100).

20 Claims, 6 Drawing Sheets

(51) Int. Cl.
    *H04J 14/08*           (2006.01)
    *H04J 14/00*           (2006.01)

(58) Field of Classification Search
    CPC .............. H04B 10/114; H04B 10/1143; H04B
                                10/1149; H04B 10/116
    See application file for complete search history.

(56)                     References Cited

U.S. PATENT DOCUMENTS

| | | |
|---|---|---|
| 9,692,507 B2 | 6/2017 | Shin et al. |
| 2006/0007907 A1* | 1/2006 | Shao ................... H04W 72/542 |
| | | 370/347 |
| 2019/0020414 A1 | 1/2019 | Jiang et al. |
| 2019/0020744 A1* | 1/2019 | Dong ................... H04L 69/321 |
| 2019/0207644 A1 | 7/2019 | Rasmussen |

OTHER PUBLICATIONS

Shao, et al., "Solutions and Discussions to Direct and Indirect Beacon Conflict Problem", IEEE 802.15.4b, Sep. 1, 2004, pp. 1-23.

* cited by examiner

400

500

600

S601

S602

S603

700

S701

S702

S703

S704

S705

800

1

SYNCHRONIZATION IN OPTICAL WIRELESS NETWORKS FOR INTERFERENCE SUPPRESSING

CROSS-REFERENCE TO PRIOR APPLICATIONS

This application is the U.S. National Phase application under 35 U.S.C. § 371 of International Application No. PCT/EP2020/077174, filed on Sep. 29, 2020, which claims the benefit of European Patent Application No. 19201936.2, filed on Oct. 8, 2019. These applications are hereby incorporated by reference herein.

FIELD OF THE INVENTION

The invention relates to the field of scheduling transmissions in optical wireless networks, such as Li-Fi networks. More particularly, various methods, apparatus, systems and computer-readable media are disclosed herein related to synchronization among adjacent access points or coordinators.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi is running out of spectrum to support this revolution. In the meanwhile, Li-Fi is drawing more and more attention with its capability to support higher data rates over the available bandwidth in visible light, ultraviolet, and infrared spectra. Other benefits of Li-Fi include data security, and the ability to function safely in areas otherwise susceptible to electromagnetic interference. Therefore, Li-Fi is a very promising new technology to enable the next generation of immersive connectivity.

Visible-light communication (VLC) transmits data by intensity modulating optical sources, such as light emitting diodes (LEDs) and laser diodes (LDs), faster than the persistence of the human eye. VLC merges lighting and data communications in applications such as illumination, signage, streetlights, vehicle lighting, and traffic signals. The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light for communication.

In the star topology, the communication is established between devices and a single central controller, called the coordinator. In the peer-to-peer topology, one of the two devices in an association takes on the role of the coordinator. In the coordinated topology, multiple devices communicate with multiple coordinators, supervised by a global network controller. The global network controller has a fixed network link to each coordinator.

For handling interference in an optical wireless communication system, or a Li-Fi system, with multiple access points (APs) or coordinators having overlapping coverage area based on time-division, the coordinators must be synchronized to a common time base. IEEE Std 1588-2008 describes a protocol to synchronize distributed clocks across a network, whereby a high accuracy can be achieved by dedicate support from routers/switches in the network. However, with an existing infrastructure, the routers/switches may not yet support this protocol, and hence, the uncertainty of the synchronization increases, which also results in interference to the end points (EPs) or network devices located in the overlapping area of adjacent APs or coordinators.

US2006007907A1 relates to beacon scheduling in a wireless personal area network including a device and multiple coordinators within transmission range of the device. A superframe is defined to include a beacon period, a contention access period, and a contention free period. The beacon period includes multiple slots. In each coordinator, a particular beacon slot is selected to be non-conflicting with beacon slots selected by other coordinators. Beacons are then transmitted to the device by the coordinators at time periods associated with the selected slots.

US2019020414A1 relates to a beacon sending method and a network access method. The method is: sending, by a coordinator, a beacon by occupying a first beacon timeslot in a current super frame, and after sending the beacon, receiving a first beacon request frame sent by a device, where the first beacon request frame is used to indicate that the device is located in an interference area between an area of a first network in which the coordinator is located and an area of at least one second network; and after receiving the first beacon request frame, sending, by the coordinator, a beacon by separately occupying a first beacon timeslot and a second beacon timeslot in each of N super frames starting from a next super frame, where N≥1, and N is a positive integer.

SUMMARY OF THE INVENTION

Because of the line-of-sight character of an optical wireless communication network, neighboring coordinators may not be able to communicate with each other directly. Hence, the information exchange among neighboring coordinators may rely on a network device that is located in the overlapping area of the coverage areas of these neighboring coordinators or rely on another device in the backbone network, such as a network controller. Due to the lack of direct communication, such adjacent coordinators sometimes may not have synchronous MAC cycles. Although the durations of one MAC cycle is typically the same for all the coordinators in the network, the start times of MAC cycles can be different for individual coordinators. Note that the start time of a MAC cycle is used by a coordinator as a local time reference to divide the wireless medium into consecutive time slots. Such an offset of MAC cycles among two adjacent coordinators may cause interference to a network device located in the overlapping coverage areas of these two adjacent coordinators, even when a time slot is allocated exclusively to one coordinator for communication with the network device in the overlapping area.

In view of the above, the present disclosure is directed to methods, apparatus, systems, computer program and computer-readable media for providing a mechanism to handle the synchronization of MAC cycles among adjacent APs or coordinators. More particularly, the goal of this invention is achieved by a network device as claimed in claim 1, by a coordinator as claimed in claim 10, by a method as claimed in claims 14 and 15 for the network device and the coordinator respectively, by a computer program as claimed in claim 19, and by a system as claimed in claim 20.

Accordingly, a network device located in the overlapping area of at least two adjacent coordinators is capable of deriving timing information related to MAC cycles of the at least two coordinators based on downlink communication from these coordinators. The network device is configured to subsequently send such timing information to at least one of the two adjacent coordinators via an out-of-band channel, when the network device is determined to assist with alignment of MAC cycles between the at least two adjacent coordinators. The timing information may be derived from a regular downlink data communication on the OWC network, or downlink data on the out-of-band channel. In order to facilitate the network device in deriving the timing information, the coordinators may send periodic beacons or synchronization messages in the downlink communication via OWC network or the out-of-band channel.

In accordance with a first aspect of the invention a network device is provided. A network device out of a plurality of network devices for reducing interference in an optical wireless communication, OWC, network having a line-of-sight character, the OWC network comprising at least two coordinators and the plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access, TDMA, approach by dividing the wireless medium into consecutive time slots. The network device comprising: a first receiver configured to detect downlink communication over the OWC network within the first pre-defined spectrum range; a controller configured to decide on assisting with alignment of Medium Access Control, MAC, cycles between at least two adjacent coordinators, based on the downlink communication from the at least two adjacent coordinators detected by the first receiver; a second transmitter configured to send a signal comprising timing information related to MAC cycles of the at least two adjacent coordinators, via an out-of-band channel outside the first pre-defined spectrum range, upon the decision on assisting with the alignment of MAC cycles between the at least two adjacent coordinators for interference suppression; and wherein the out-of-band channel has a line-of-sight character.

Since adjacent coordinators cannot communicate directly, they may not be aware of the misalignment of MAC cycles amongst one another and may not be able to fix the problem. Beneficially, a network device may decide to act as a middle person to assist the neighboring coordinators with the alignment of MAC cycles for interference suppression. The network device is configured to monitor the downlink communication over the OWC network to derive timing information related to the MAC cycles, so that it can provide the timing information to the coordinators via an out-of-band channel. Given that both the OWC network and the out-of-band channel have a line-of-sight character, as long as the network device can detect the downlink data from the adjacent coordinators, the uplink signal from the network device may also reach the corresponding adjacent coordinators.

The timing information can be a signal to indicate the start time of individual MAC cycles of the adjacent coordinators, the offset among individual MAC cycles of the adjacent coordinators, or a start time of MAC cycles of one coordinator out of the adjacent coordinators. The main purpose of such timing information is to provide a common timing reference for the adjacent coordinators that are out of reach from each other to be able to adjust their MAC cycles.

The benefit to make use of the out-of-band channel is to reduce the overhead in the OWC network for MAC cycle alignment. In one example, the network device may derive the timing information via regular data communication of the coordinators, and hence extra overhead on the OWC network to support such alignment is reduced.

The out-of-band channel may differ from a channel of the OWC network in terms of spectrum range, wavelength, or another attribute allowing parallel communication over different spectrum ranges. In another example, the out-of-band channel is another optical channel with another spectrum range below the first pre-defined spectrum range. Preferably, signals sent over the out-of-band channel can propagate over a same or a larger coverage area than signals sent over the OWC network.

Advantageously, the network device further comprises a second receiver configured to detect downlink data on the out-of-band channel; and wherein the decision on assisting with the alignment of MAC cycles between at least two adjacent coordinators, is based on either the downlink communication from the at least two adjacent coordinators detected by the first receiver or the downlink data from the at least two adjacent coordinators detected by the second receiver.

It is also possible to make use of the out-of-band channel as a bidirectional signaling channel. The network device may also detect downlink data from the adjacent coordinators on the out-of-band channel and derive the timing information therefrom. In that sense, the network device may have two instruments to obtain the timing information related to MAC cycles of the adjacent coordinators, either via the in-band downlink communication over OWC network, or via the out-of-band downlink data on the out-of-band channel.

In one embodiment, the second transmitter is configured to send periodic signals to the at least two adjacent coordinators for use by the at least two adjacent coordinators as timing reference in adjusting their MAC cycles, and wherein the periodic signals indicate a new start-time of MAC cycles according to the timing information related to MAC cycles of the at least two adjacent coordinators.

One example of the uplink signal from the network device to assist the MAC alignment is to make use of periodic signals from the network device. The periodic signals indicate a new start-time of MAC cycles that the adjacent coordinators can follow, which may be a compromise of the start-times of two adjacent coordinators, a start-time of MAC cycles of one out of the adjacent coordinators, or simply a new start-time derived by the network device after knowing the start-times of MAC cycles of the adjacent coordinators. What is relevant is that the network device and the coordinators are operating under the same assumptions as to the information that is reported and the subsequent correction(s) going forward.

It is further disclosed that the network device is configured to detect periodic beacons from the at least two adjacent coordinators by the first receiver over the OWC network, and send signals to the at least two adjacent coordinators by the second transmitter on the out-of-band channel, by reflecting each of the periodic beacons to the at least two adjacent coordinators with a predefined delay following receipt of each of the periodic beacons.

In another example, the downlink communication over the OWC network comprises downlink periodic beacons from the adjacent coordinators. It is not necessary to send periodic beacons at the start-time of each MAC cycle. The periodic beacons can be sent at any predefined offset from the start-time of the MAC cycles. It is necessary to keep the interval between adjacent periodic beacons the same duration of a MAC cycle, which is agreed for the entire OWC network. Such periodic beacons may, but need not, be dedicated beacons for assisting alignment on MAC cycles among adjacent coordinators. They may be simply re-used from a regular beacon in a TDMA system for synchronization among multiple network devices associated to the coordinator.

The network device may be configured to reflect each of the periodic beacons back to the adjacent coordinators, as a relay node, to enable an indirect link between the adjacent coordinators. To tolerate certain transmission delay, processing delay, or even transmitter and receiver switching delay in case of a transceiver setup, the network device will reflect each of the beacons with a predefined delay following receipt of the beacons. The predefined delay can be a fixed time offset defined according to those delays. The predefined delay can also be a fixed delay agreed by the coordinators, such as a MAC cycle duration. And then, the network device will send back a reflected beacon after one full MAC cycle upon receipt.

If there are multiple beacons reflected by the network device, it is clear to the coordinators that there are offsets of MAC cycles among adjacent coordinators, which indicates further adjustment to the MAC cycles will be needed. In this manner the problem at hand is identified as a first step towards resolving it.

Preferably, the network device is configured to detect periodic beacons from the at least two adjacent coordinators by the second receiver on the out-of-band channel, and send signals to the at least two adjacent coordinators by the second transmitter on the out-of-band channel, by reflecting each of the periodic beacons to the at least two adjacent coordinators with a predefined delay following receipt of each of the periodic beacons.

The periodic beacons can also be sent on the out-of-band channel from the coordinators to the network device. This may be more efficient when there are no existing periodic beacons in the OWC network that can be shared to support the present invention.

Advantageously, the network device is associated to a local coordinator out of the at least two adjacent coordinators, and another one out of the at least two adjacent coordinators is a neighboring coordinator of the network device. Preferably, the network device is configured to
  detect synchronization messages from the local coordinator and the neighboring coordinator by the first receiver over the OWC network; and wherein a synchronization message comprises identification information of the individual coordinator;
  derive a relative offset by the controller, following receipt of the synchronization message from the neighboring coordinator, and wherein the relative offset is the time interval between the time of reception of the synchronization message from the neighboring coordinator as compared to the start-time of the current MAC cycle of the local coordinator; and
  send a signal to the local coordinator by the second transmitter on the out-of-band channel, the signal comprising identification information of the neighboring coordinator and the relative offset derived by the network device.

The network device may also be associated to a local coordinator out of the two adjacent coordinators, so that the network device is synchronized to the local coordinator. The downlink communication from the local and the neighboring coordinators can be a single synchronization message or several recursive synchronization messages comprising identification information of the individual coordinator respectively.

The synchronization message may be sent by an individual coordinator with a predetermined, possibly arbitrary, offset from the start of a MAC cycle of the individual coordinator. Although the network device may not have the knowledge of such arbitrary offset of a neighboring coordinator, it can derive a relative offset following receipt of the synchronization message from the neighboring coordinator. The relative offset is the time interval between the time of reception of the synchronization message from the neighboring coordinator as compared to the start-time of the current MAC cycle of the local coordinator. The network device will then forward the identification information and the derived relative offset back to the local coordinator via the out-of-band channel. The local coordinator also needs to know the arbitrary offset of the neighboring coordinator when sending the synchronization message in order to derive the actual offset on MAC cycles and to implement any adjustment accordingly. If the local coordinator does not have that knowledge available, it may forward the signal received from the network device to a centralized device with such knowledge, such as a network controller. And then the decision can be made at the network controller side with regard to the manner in adjusting the MAC cycles of at least one out of the adjacent coordinators.

Alternatively, the local coordinator may have a wired connection to the neighboring coordinator directly. Given the identification information received from the network device, the local coordinator may use it to address the neighboring coordinator to request the information about the predetermined offset used by the neighboring coordinator in sending the synchronization message. And then the local coordinator also obtains sufficient information to implement a local adjustment to MAC cycles to get synchronized to the neighboring coordinator.

Optionally, the neighboring coordinator may also overhear the uplink signal from the network device. Then, the neighboring coordinator is aware of both the relative offset derived by the network device, which is relative to the start-time of the local coordinator, and its own arbitrary offset of its own to send the synchronization message. Therefore, the neighboring coordinator obtains sufficient knowledge to implement a MAC cycle alignment locally with regard to the local coordinator.

Preferably, the network device is configured to detect synchronization messages from the local coordinator and the neighboring coordinator by the second receiver on the out-of-band channel; wherein a synchronization message comprises identification information of the individual coordinator. Then the network device is configured to derive a relative offset by the controller, following receipt of the synchronization message from the neighboring coordinator, and wherein the relative offset is the time interval between the time of reception of the synchronization message from the neighboring coordinator as compared to the start-time of the current MAC cycle of the local coordinator. And the network device is further configured to send a signal to the local coordinator by the second transmitter on the out-of-band channel, the signal comprising identification information of the neighboring coordinator and the relative offset derived by the network device.

Advantageously, the network device is configured to detect synchronization messages of a second type from the local coordinator and the neighboring coordinator by the first receiver over the OWC network; and wherein a synchronization message of the second type comprises identification information of the respective coordinator transmitting the synchronization message and a time interval between the transmission of the synchronization message as compared to the start-time of a MAC cycle of the respective coordinator. The controller is configured to derive a second time interval, following receipt of a synchronization message of the second type from the neighboring coordinator, and wherein the second time interval is the time interval between the reception of the synchronization message from the neighboring coordinator as compared to the start-time of the current MAC cycle of the local coordinator. The second transmitter is configured to send a signal to the local coordinator on the out-of-band channel, and wherein the signal comprises identification information of the neighboring coordinator, the time interval comprised in the synchronization message from the neighboring coordinator, and the second time interval derived by the network device.

The synchronization messages from the coordinators can also be of a second type with timing information embedded therein, which indicates an arbitrary offset, which is a time interval between the transmission of the synchronization message as compared to the start-time of a MAC cycle of the respective coordinator. Upon receipt of the synchronization messages of the second type, the network device derives a second time interval, indicating the timing gap between the reception of the synchronization message from the neighboring coordinator as compared to the start-time of the current MAC cycle of the local coordinator. And then the network device sends a signal to the local coordinator on the out-of-band channel, and the signal comprises identification information of the neighboring coordinator, the time interval comprised in the synchronization message from the neighboring coordinator, and the second time interval derived by the network device. In this manner, the local coordinator will obtain sufficient information to implement the alignment on MAC cycles to synchronize with the neighboring coordinator. Likewise, the neighboring coordinator may synchronize, if the neighboring coordinator overhears the signal. When both overhear, it is preferred that only one out of the two adjacent coordinators will implement the alignment, or both coordinators will make the alignment in a cooperative way, such as to adjust only half of the offset as derived locally. Otherwise, a ping-pong effect will be created. To avoid that situation, the involvement of a network controller may also be beneficial.

Advantageously a network device is configured to detect synchronization messages of a second type from the local coordinator and the neighboring coordinator by the second receiver on the out-of-band channel; and wherein a synchronization message of the second type comprises identification information of the respective coordinator transmitting the synchronization message and a time interval between the transmission of the synchronization message as compared to the start-time of a MAC cycle of the respective coordinator. The controller is configured to derive a second time interval, following receipt of a synchronization message of the second type from the neighboring coordinator, and wherein the second time interval is the time interval between the reception of the synchronization message from the neighboring coordinator as compared to the start-time of the current MAC cycle of the local coordinator. And then the second transmitter sends a signal to the local coordinator on the out-of-band channel, and wherein the signal comprises identification information of the neighboring coordinator, the time interval comprised in the synchronization message from the neighboring coordinator, and the second time interval derived by the network device.

With the signal received from the network device, which comprises two kinds of timing information that are relative to the local and neighboring coordinator respectively, the local coordinator is able to derive the offset of MAC cycles against the neighboring coordinator and to implement an adjustment.

In accordance with a second aspect of the invention a coordinator device is provided. A coordinator out of at least two coordinators for reducing interference in an optical wireless communication, OWC, network having a line-of-sight character, the OWC network comprising the at least two coordinators and a plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access, TDMA, approach by dividing the wireless medium into consecutive time slots, the coordinator comprising: a first transmitter configured to send out data via downlink communication over the OWC network within the first pre-defined spectrum range; a second receiver configured to receive a signal from a network device via an out-of-band channel outside the first pre-defined spectrum range, and wherein the signal comprising timing information related to MAC cycles of at least two adjacent coordinators is intended to assist with alignment of MAC cycles between the at least two adjacent coordinators, from which the network device detects downlink communication; wherein the out-of-band channel has a line-of-sight character.

Advantageously, a coordinator device is also provided to cooperate with the foregoing network device(s). As a basic setup, the coordinator will carry out both downlink data communication as usual, and additionally the coordinator will also monitor on the out-of-band channel for the uplink signal from the network device, which comprises timing information related to MAC cycles of adjacent coordinators, which is needed for the alignment of MAC cycles.

Preferably, the coordinator further comprises a second transmitter configured to send downlink data on the out-of-band channel.

In correspondence to the option that the network device detects downlink data on the out-of-band channel to derive the timing information to assist MAC alignment, the coordinator may comprise the second transmitter to support downlink signaling to convey the information related to the start-time of a MAC cycle.

In another embodiment, the coordinator further comprises a controller configured to adjust a start-time of its MAC cycles according to the signal received from the network device, and wherein a time duration of a MAC cycle is defined by the OWC network, and the start-time of a MAC cycle is a local time reference used by the coordinator to divide the wireless medium into consecutive time slots.

In case that a coordinator obtains sufficient information to adjust its MAC cycle via the out-of-band channel, the adjustment may be carried out locally at the coordinator. The timing information comprised in the signal received from the network device will be used as a reference for the coordinator to adjust the start-time of its MAC cycles.

In a further embodiment, the coordinator further comprises: a third transmitter configured to forward the signal received from the network device to a network controller via a wired connection and a third receiver configured to receive an instruction from the network controller via the wired connection. The coordinator further comprises a controller configured to adjust a start-time of its MAC cycles according to the instruction received from the network controller, and wherein a time duration of a MAC cycle is defined by the OWC network, and the start-time of a MAC cycle is a local time reference used by the coordinator to divide the wireless medium into consecutive time slots.

When the timing information comprised in the signal received from the network device is not sufficient for the coordinator to adjust its MAC cycles to synchronize to a neighboring coordinator, the coordinator may also further resort to assistance from a network controller by forwarding the signal received from the network device to a network controller. It is possible that the network controller may have the overview of the timing information, such as the arbitrary time offset in sending a synchronization message of a neighboring coordinator on the network.

Alternatively, when the network controller does not have all the timing information beforehand, it can query such timing information on the fly, given that the network controller will have a wired connection to all the coordinators in the OWC network. Furthermore, based on the signal from the network device forwarded by the coordinator, which comprises identification information of the neighboring coordinator, the network controller has a good knowledge about the neighboring relationship of the at least two neighboring coordinators, given that the network controller will also know which coordinator is forwarding the signal. And then the network controller can decide on the adjustment and send an instruction to at least one or both of the coordinators for the implementation. Thus, the timing information needed to assist the MAC alignment is collected in a distributed approach, and the MAC cycle alignment is controlled in a centralized approach.

In accordance to a third aspect of the invention, a method of a network device is provided. A method for reducing interference at a network device out of the plurality of network devices in an optical wireless communication, OWC, network having a line-of-sight character, the OWC network comprising at least two coordinators and the plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access, TDMA, approach by dividing the wireless medium into consecutive time slots, the method comprising the network device out of the plurality of network devices: detecting a downlink communication over the OWC network within the first pre-defined spectrum range; deciding on assisting with alignment of MAC cycles between at least two adjacent coordinators, based on the detected downlink communication from the at least two adjacent coordinators; and sending a signal comprising timing information related to MAC cycles of the at least two adjacent coordinators via an out-of-band channel outside the first pre-defined spectrum range, upon the decision made by the controller on assisting with the alignment of MAC cycles between the at least two adjacent coordinators for interference suppression; and wherein the out-of-band channel has a line-of-sight character.

In accordance to another aspect of the invention, a method of a coordinator device is provided. A method for reducing interference at a coordinator out of at least two coordinators in an optical wireless communication, OWC, network having a line-of-sight character, the OWC network comprising the at least two coordinators and a plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access, TDMA, approach by dividing the wireless medium into consecutive time slots, the method comprising the coordinator out of the at least two coordinators: sending out data via downlink communication over the OWC network within the first pre-defined spectrum range; receiving a signal from a network device comprising timing information related to MAC cycles of at least two adjacent coordinators via an out-of-band channel outside the first pre-defined spectrum range, and wherein the signal is intended to assist with alignment of MAC cycles between the at least two adjacent coordinators, from which the network device detects downlink communication; wherein the out-of-band channel has a line-of-sight character.

Preferably, the method comprises a coordinator out of the at least two coordinators sending downlink data on the out-of-band channel. The downlink data comprises information related to the MAC cycles over the OWC network of an individual coordinator.

More preferably, the method further comprises a coordinator out of the at least two coordinators adjusting the start time of its MAC cycles according to the signal received from the network device, and wherein a time duration of a MAC cycle is defined by the OWC network, and the start time of a MAC cycle is a local timing reference used by the coordinator to divide the wireless medium into consecutive time slots.

Advantageously, the method further comprises a coordinator out of the at least two coordinators: sending periodic beacons at a predefined position in each of its MAC cycles; and receiving signals via the out-of-band channel from the network device, and wherein the signals are reflected periodic beacons received by the network device from the at least two adjacent coordinators; and adjusting the start-time of its MAC cycles, following receipt of more than one reflected beacon within a single MAC cycle from the network device, for reducing a gap among the more than one reflected beacon.

In a further embodiment, the method further comprises a coordinator out of the at least two coordinators: sending a synchronization message, the synchronization message comprising identification information of the coordinator; and receiving a signal via the out-of-band channel from the network device that is associated to the coordinator, the signal comprising identification information of a neighboring coordinator and a timing offset, the timing offset derived by the network device and representing a time interval between the time of reception of the synchronization message from a neighboring coordinator as compared to the start-time of the current MAC cycle of the coordinator; forwarding the signal received from the network device to a network controller via a wired connection; receiving an instruction from the network controller via the wired connection; and adjusting the start-time of a MAC cycle according to the instruction received from the network controller.

In another preferred embodiment, the method further comprising a coordinator out of the at least two coordinators: sending a synchronization message, and wherein the synchronization message comprises identification information of the coordinator and a time interval between the transmission of the synchronization message as compared to the start-time of a current MAC cycle; and receiving a signal via the out-of-band channel from the network device that is associated to the coordinator, and wherein the signal comprises identification information of a neighboring coordinator, the time interval comprised in another synchronization message from the neighboring coordinator, and a second time interval derived by the network device representing a time interval between the time of reception of the other synchronization message from a neighboring coordinator as compared to the start time of the current MAC cycle of the coordinator; and the method further comprising either: adjusting the start time of a MAC cycle according to the signal received from the network device; or: forwarding the signal received from the network device to a network controller via a wired connection; receiving an instruction from the network controller via the wired connection; and adjusting the start time of a MAC cycle according to the instruction received from the network controller.

The invention may further be embodied in a computer program comprising code means which, when the program is executed by a computer, cause the computer to carry out the method of the network device and the coordinator.

In a particularly advantageous system for reducing interference, the system comprises an optical wireless communication, OWC, network with a line-of-sight character comprising at least two coordinators according to the invention and a plurality of network devices selectively associated to and synchronized with a respective one of the coordinators, and wherein the at least two coordinators and the plurality of network devices share a same wireless medium of the OWC network via a TDMA approach by dividing the wireless medium into consecutive time slots; a network device out of the plurality of network devices according to the invention; and a first coordinator, which the network device is associated to, being one out of the at least two coordinators; and a second coordinator, which is next to the local coordinator, being another one out of the at least two coordinators; and a network controller, which is connected to the first coordinator and the second coordinator via a wired connection; and wherein the network controller is configured to receive the signal originated from the network device and forwarded by the first coordinator; determine an adjustment needed to align the MAC cycles of the first coordinator and the second coordinator, following receipt of the signal; instruct at least one of the first coordinator or the second coordinator to implement the determined adjustment of the MAC cycles.

In another example, the centralized control for the alignment of MAC cycles is carried out by a control function unit, which can be located at the coordinator or at the network controller. In the case the control function unit is located at the coordinator side, it may query timing information related to the neighboring coordinator or send instruction(s) to the neighboring coordinator via the network controller when there is no wired connection among coordinators. When there is a wired connection between the local coordinator and the neighboring coordinator, the control function unit may query timing information or send instruction(s) to the neighboring coordinator directly.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figures 1, 2:
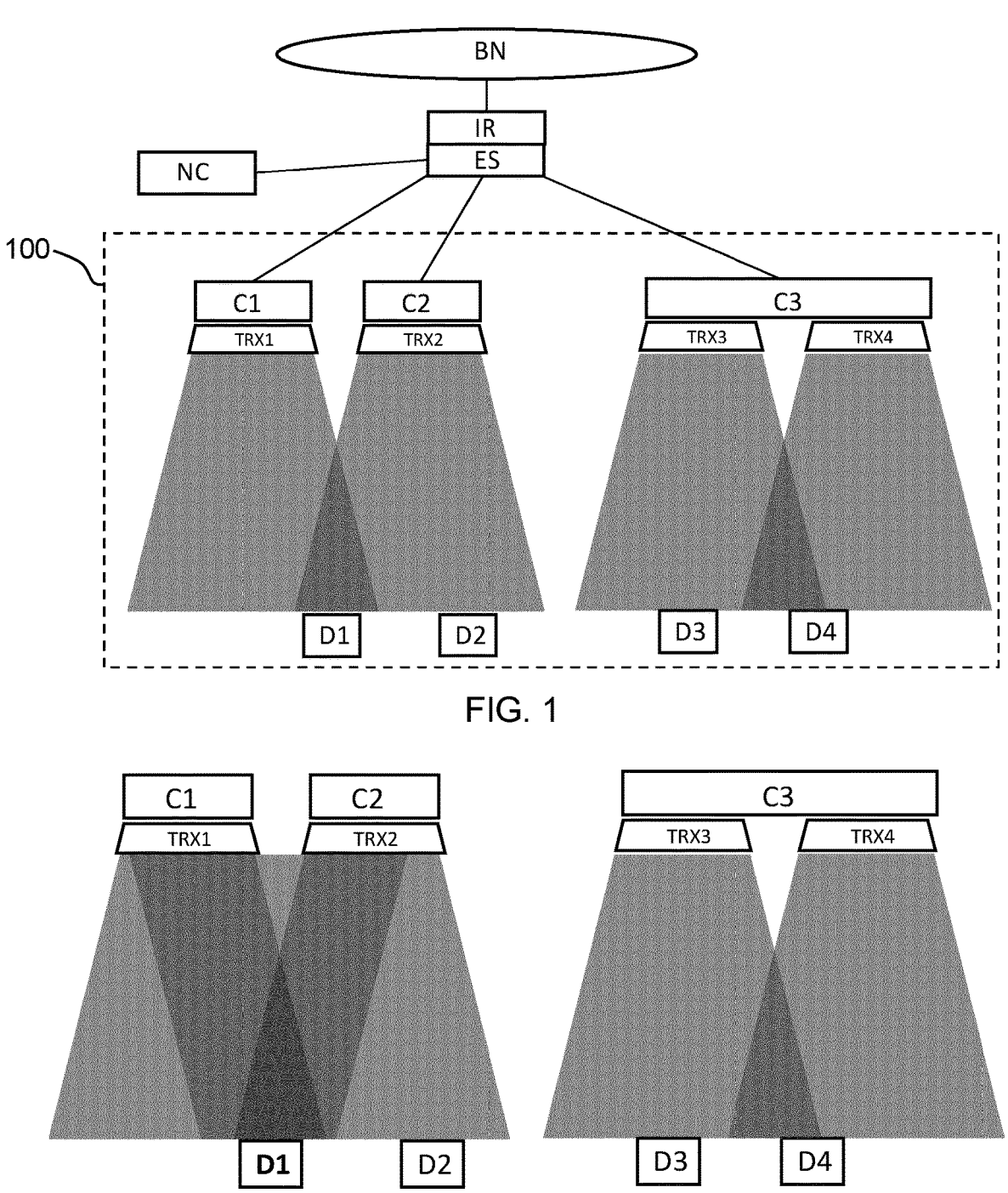
FIG. 1 demonstrates an overview of the OWC network, and the backbone network connected to it.
FIG. 2 illustrates the line-of-sight character of both the downlink communication of the OWC network and the uplink communication on the out-of-band channel.

Various embodiments of the present invention will now be described based on an optical wireless communication (OWC) network system 100 as shown in FIG. 1. For illustration purposes, the OWC network is connected to a backbone network BN via an IP router IR and an Ethernet switch ES, while in a practical system more routers and switches may be connected between the OWC network and the backbone network. For a centralized control of the OWC network system 100, there is a network controller NC connected to the coordinators in the OWC network. The OWC network comprises at least two coordinators C1-Cn and a plurality of network devices D1-Dn selectively associated to and synchronized with a respective one of the coordinators C1-Cn. Because of the line-of-sight character of the optical communication link, adjacent coordinators C1-Cn do not have a direct link amongst each other. A network device D1-Dn located in the overlapping area of the coverage of adjacent coordinators is able to detect optical signals from both coordinators. The system uses a time-division multiple access, TDMA, approach by dividing the wireless medium into consecutive time slots, the interference problem to the network device in the overlapping area may be alleviated, if adjacent coordinators do not use the same slot for a downlink communication. Of course, this is based on the assumption that adjacent coordinators are synchronized to a common timing reference, or their MAC cycles are aligned.

For an OWC network, there can be different approaches to achieve such synchronization. It may be realized locally by detecting the zero-crossings of AC mains. Given the relatively low frequency of the AC mains and the potential high spur levels, the zero-crossing based approach is not very reliable to achieve high-accuracy synchronization. An alternative is to achieve the synchronization based on a common remote timing reference, such as a clock at a remote synchronization server.

The clock synchronization problem has been studied thoroughly in the areas of Internet and local area networks (LANs) for the last several decades. There are many well-known protocols for maintaining synchronization in computer networks. As explained in the summary section, one primary problem to be solved in the network-based clock synchronization is the time transfer latency, which includes both the processing delay of the operating system, and also the network latency created by hubs, switches, cables, and other hardware components that exist between the remote reference clock and the local clock. The processing delay is more deterministic, while the network latency is much more uncertain. The network latency depends on the length of the path between the remote timing reference and the local clock, the number of hardware components located on the path, and also the dynamic traffic condition in the network. If the network is heavily loaded, more buffering time will be needed at routers or switches, which all adds up to the time transfer latency from the remote timing reference to the local clock. In opposite, if the network experiences little traffic, the time transfer latency will be much shorter as compared to the previous scenario, because of the reduced buffering time at routers and switches.

Another problem is that the local clock may drift for an individual coordinator, and the drift speed will depend on the accuracy of the clock generation system of the individual coordinator. On the other hand, if there is no network device located in the overlapping area of adjacent coordinators, there is also no urgent need to ensure the alignment of MAC cycles among adjacent coordinators.

In general, synchronization of adjacent coordinators by using the optical, or Li-Fi, medium is hampered due to the lack of line-of-sight of adjacent coordinators, given that the coordinators are typically deployed on the ceiling out of view of one-another. Adjacent coordinators require a network device to be present in an overlapping area to relay the communication needed for synchronization. When adjacent coordinators are not synchronized, it is very difficult to achieve a scheduled interference-free communication with the network devices. This means that collisions due to misalignment of MAC cycles will be expected. To reduce the probability of collisions to an acceptable level, a significant amount of time may be reserved for coordinators to carry out tasks on neighbor detection and reporting, which result in inefficient use of the radio resource.

Thus, inventors have recognized and appreciated that it would be beneficial to make use out-of-band signaling for the control on the alignment of MAC cycles. A network device located in the overlapping area will relay timing information to the coordinators with out-of-band signaling. The out-of-band signaling should not interfere with the normal OWC network, or the Li-Fi communication. And hence, the control for the adjustment of MAC cycles can be kept in the background, which improves the efficiency on using the OWC network for data communication.

As shown in FIG. 1, each coordinator controls one or multiple transceivers (TRX) for optical communication towards network devices D1-Dn. A coordinator applies a time-slot schedule for the communicating with the network devices associated to it. Note that the transceiver can also be implemented using two separate devices, such as a stand-alone transmitter and a stand-alone receiver, and the TRX shown in the figure is only for illustration purposes. The shadow area next to each transceiver indicates the communication coverage of each coordinator. For a network device located in the overlapping area of the coverage belonging to different coordinators, alignment on MAC cycles will be needed. In the example shown in the figure, transceivers TRX1 and TRX2, controlled by neighboring coordinators C1 and C2, may cause interference on a network device D1, if there is a misalignment between the MAC cycles of TRX1 and TRX2. The network device D4 is within the coverage area of both TRX3 and TRX4 but does not suffer from interference, as TRX3 and TRX4 are controlled by the same coordinator C3. Therefore, there is no alignment needed among TRX3 and TRX4.

FIG. 2 illustrates the line-of-sight character of both the downlink communication of the OWC network and the uplink communication on the out-of-band channel from the network device D1. Because of the same line-of-sight character carried by both the OWC network and the out-of-band channel, the uplink signal from D1 to the adjacent coordinators C1 and C2 will be received by these adjacent coordinators, as long as network device D1 is able to receive the downlink communication from both.

Figure 3:
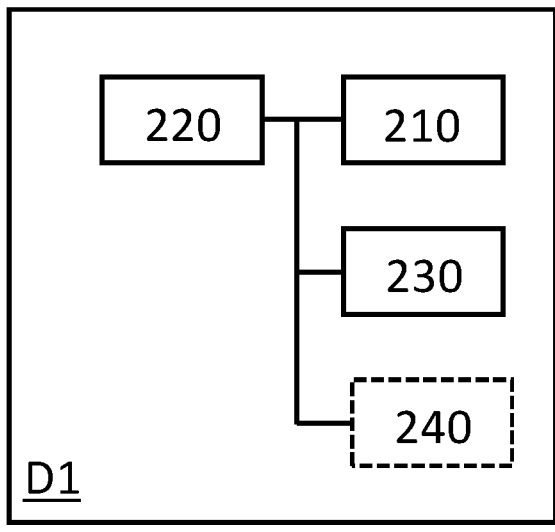
FIG. 3 schematically depicts basic components of a network device.

Referring to FIG. 3, we take network device D1 as an example to explain the basic components of a network device. The blocks with solid lines 210, 220, 230 are the most essential building blocks to enable this invention. The first receiver 210 is configured to detect downlink communication over the OWC network within a first pre-defined spectrum range. The controller 220 is configured to decide on assisting with alignment of Medium Access Control, MAC, cycles between at least two adjacent coordinators. It can happen that the controller does some preliminary assessment on whether interference due to misalignment of MAC cycles is experienced by the network device. The controller will decide to assist with the alignment when there is interference experienced. The second transmitter 230 is configured to send an uplink signal via an out-of-band channel, which is out-of-band for the OWC network, to the coordinators, and the uplink signal comprises timing information related to MAC cycles of the adjacent coordinators.

Optionally, the network device D1 may further comprise a second receiver 240 to detect downlink data on the out-of-band channel from the adjacent coordinators. In this example, the coordinators will use the out-of-band channel as a bi-directional signaling channel to send out downlink data on the out-of-band channel and also to receive the signal comprising timing information related to MAC cycles from the network device on the same out-of-band channel. And then, the controller 220 may make the decision on assisting MAC alignment based on either the downlink communication detected by the first receiver 210, or the downlink data detected by the second receiver 240. The benefit of using a bi-directional signaling channel is that the downlink data on the out-of-band channel may convey dedicated information related to MAC cycles, and it is more straight-forward for a network device to derive the timing information related to MAC cycles of adjacent coordinators.

Figure 4:
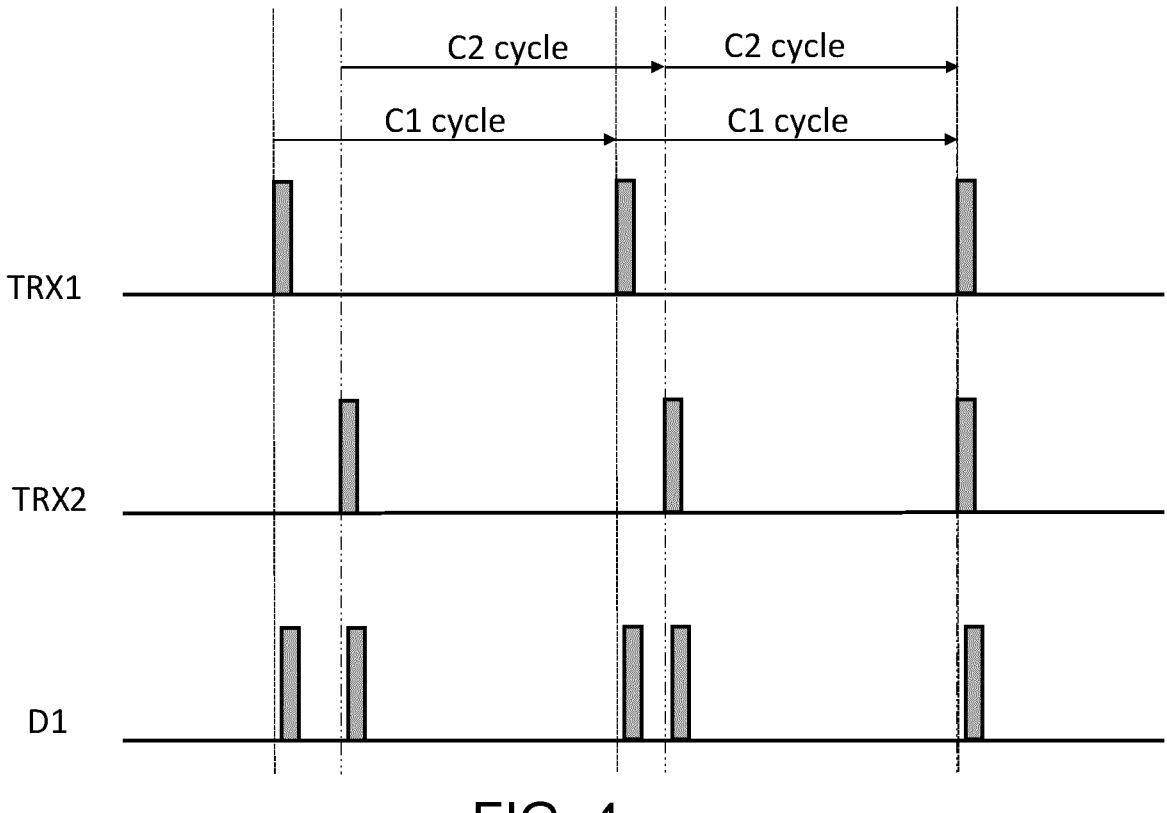
FIG. 4 demonstrates a coordinator adjusting its MAC cycle based on the mechanism that adjacent coordinators send periodic beacons to the network device and the network device reflects the periodic beacons back to the coordinators after a predefined delay.

FIG. 4 demonstrates a coordinator adjusting its MAC cycle based on the mechanism that adjacent coordinators send periodic beacons to the network device and the network device reflects the periodic beacons back to the coordinators after a predefined delay. Note that for illustration purpose, the figure only shows the beacons sent by the transceivers TRX1 and TRX2 and the network device D1. Considering the layout of the system as shown in FIG. 2, there is a direct link between TRX1-D1 and TRX2-D1 respectively. For the two devices with a direct link, they will be able to receive any signal transmitted by the other side. In this example, both TRX1 and TRX2 receive the reflected beacons from the network device D1. The bigger the offset of the MAC cycles among adjacent coordinators, the bigger the gap between the two reflected beacons within one MAC cycle duration. For the ease of illustration, only one coordinator implements the adjustment in this example. C1 keeps its cycle fixed, while C2 is managed to adjust the start-time of its MAC cycles in order to reduce the gap. It can be seen that when the periodic beacons from adjacent coordinators are aligned with each other, the network device will only reflect one beacon in a MAC cycle.

Note that it is not necessary that the periodic beacons from the coordinators are sent exactly on each start-time of individual MAC cycles. It is possible that those beacons are sent with any predefined offset from the start-time of each MAC cycle, and the predefined offset should be uniform for the coordinators in the OWC network. It is also important to keep the interval between adjacent periodic beacons the same duration as agreed for the entire OWC network, which can be one MAC cycle or several MAC cycles.

Figure 5:
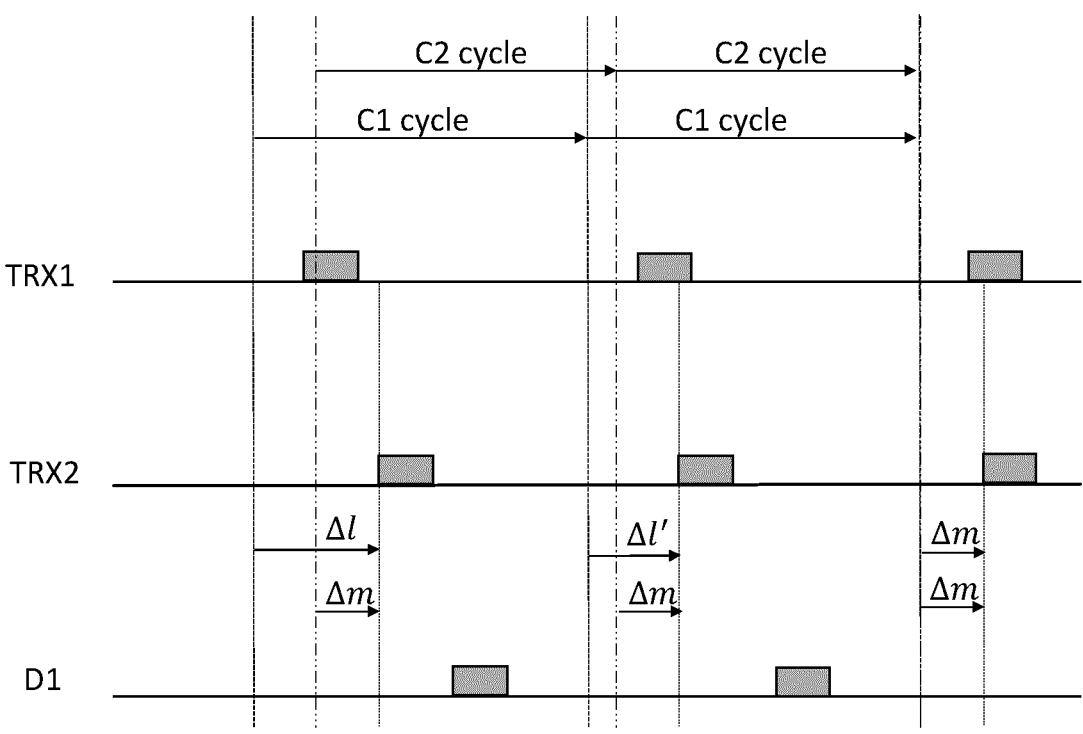
FIG. 5 demonstrates a coordinator adjusting its MAC cycle based on the mechanism that adjacent coordinators send synchronization messages to the network device and the network device sends back a signal comprising both information contained in the synchronization message and information derived locally by the network device from the synchronization message.

FIG. 5 demonstrates a coordinator adjusting its MAC cycle locally based on the mechanism that adjacent coordinators send synchronization messages of a second type to the network device and the network device sends back a signal comprising both information contained in the synchronization message and information derived locally by the network device from the synchronization message. Synchronization messages of a second type comprise identification information of the respective coordinator transmitting the synchronization message and a time interval between the transmission of the synchronization message as compared to the start-time of a MAC cycle of the respective coordinator. As shown in the figure, D1 is associated to the coordinator C1. And hence coordinator C2 is a neighboring coordinator for D1. The time interval comprised in the synchronization message from TRX2 indicates Δm as compared to the offset with regard to the start-time of a MAC cycle of C2, or TRX2. Since the network device D1 is associated to C1, it will derive a second time interval Δl indicating the duration the reception of the synchronization message from the neighboring coordinator C2 as compared to the start-time of the current MAC cycle of the local coordinator C1. The network device D1 sends a signal to the local coordinator C1 comprising information on the identification of C2, Δm and Δl. And hence, the local coordinator is able to adjust the start-time of its MAC cycle with regard to the information received from the network device D1 in order to reduce the gap between Δm and Δl. It can be seen in the figure that after two iterations that the start-time of the local coordinator C1 is aligned to the start-time of a neighboring coordinator C2.

In another example, when the coordinators are configured to send the synchronization message with only the identification information, but no timing information. And then, the network device can only derive Δl, without knowing Δm. Upon receiving the signal from the network device comprising the identification information of C2 and Δm, the local coordinator C1 will not be able to adjust the MAC cycles, given that such synchronization messages can be sent in any position of a MAC cycle. Thus, the local coordinator may have to forward the signal received from D1 to a network controller for centralized control on the alignment of MAC cycles.

Alternatively, when there is a wired connection between C1 and C2, the local coordinator C1 requests information of Δm from the neighboring coordinator C2 via the wired connection by using the identifier information of C2, as reported by D1, to address C2.

Figure 6:
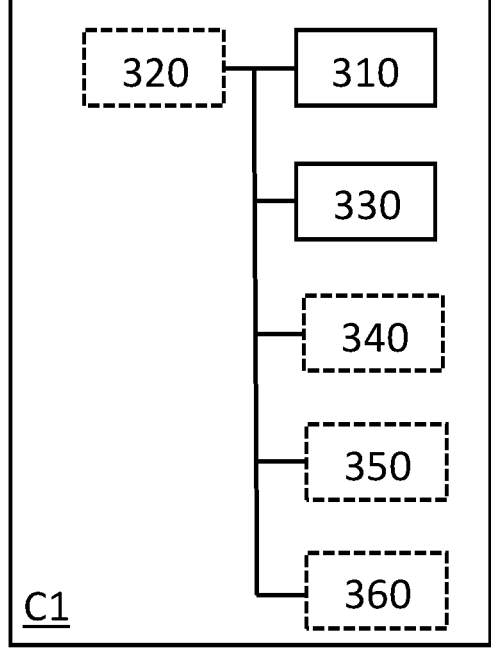
FIG. 6 schematically depicts basic components of a coordinator.

FIG. 6 illustrates a basic setup of a coordinator device. The blocks with solid lines 310 and 330 are the most essential building blocks in a coordinator C1-Cn. A first transmitter 310 is configured to send out data via downlink communication over the OWC network within the first pre-defined spectrum range. A second receiver 330 is configured to receive a signal from a network device via an out-of-band channel outside the first pre-defined spectrum range, and the signal comprises timing information related to MAC cycles of at least two adjacent coordinators. Optionally, the coordinator also comprises a second transmitter 340 to send downlink data on the out-of-band channel.

Advantageously, the coordinator further comprises a controller 320 configured to adjust a start-time of its MAC cycles according to the signal received from the network device D1, which enables the coordinator to adjust its MAC cycles locally.

In certain situations, the signal obtained from the network device is not sufficient to enable the local adjustment of MAC cycles of the coordinator. The coordinator may have to forward the signal received from a network device to a network controller for a centralized control of the alignment on MAC cycles. To facilitate this option, a third transmitter 350 is needed to forward the signal received from the network device to a network controller NC via a wired connection. Since the network controller NC has an overview of the coordinators in the OWC network and it can receive signals from multiple coordinators in the neighborhood regarding to MAC cycle alignment, the network controller may make a centralized decision on how to apply an adjustment to MAC cycles for each coordinator or a subset of coordinators. After the centralized decision is made, the network controller NC may send instructions to relevant coordinators with information on how to adjust their MAC cycles. A third receiver 360 is configured to receive such an instruction from the network controller NC via the wired connection. In this case, the controller 320 is configured to adjust a start-time of its MAC cycles according to the instruction received from the network controller NC.

Figures 7, 8:
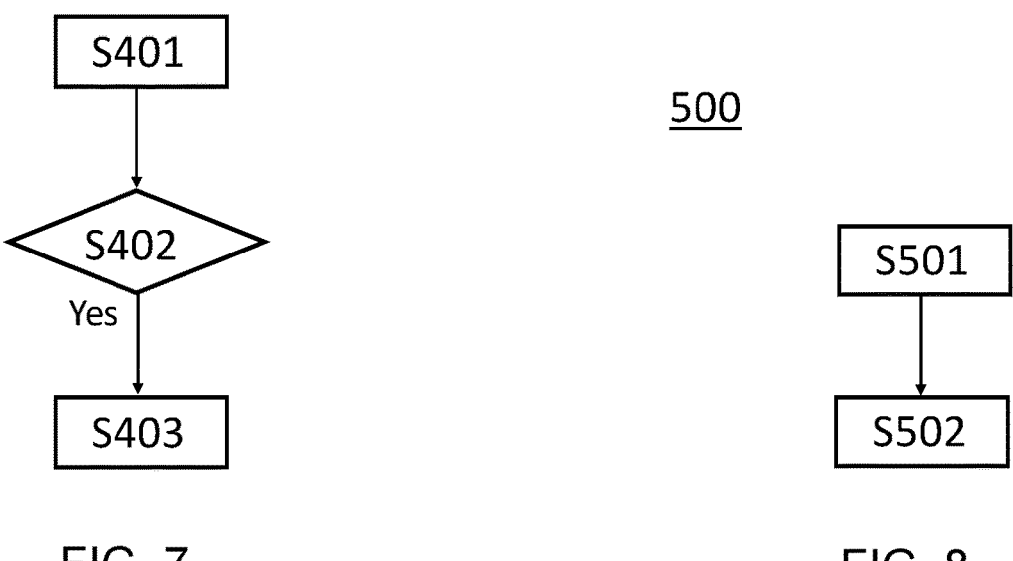
FIG. 7 shows a flow diagram of a method carried out by a network device.
FIG. 8 shows a flow diagram of a method carried out by a coordinator.

FIG. 7 shows a flow diagram of a method 400 carried out by a network device. In step S401, the network device detects a downlink communication over the OWC network 100 within the first pre-defined spectrum range, and in step S402 it decides on assisting with alignment of MAC cycles between at least two adjacent coordinators C1-Cn, based on the detected downlink communication from the at least two adjacent coordinators C1-Cn. In step S403, the network device sends a signal comprising timing information related to MAC cycles of the at least two adjacent coordinators C1-Cn via an out-of-band channel outside the first pre-defined spectrum range, upon the decision made by the controller 220 on assisting with the alignment of MAC cycles between the at least two adjacent coordinators C1-Cn for interference suppression.

FIG. 8 shows a flow diagram of a method 500 carried out by a coordinator. In step S501, the coordinator sends out data via downlink communication over the OWC network 100 within the first pre-defined spectrum range. And then it receives a signal from a network device D1 comprising timing information related to MAC cycles of at least two adjacent coordinators (C1-Cn) via an out-of-band channel outside the first pre-defined spectrum range in step S502.

Figures 9, 10:
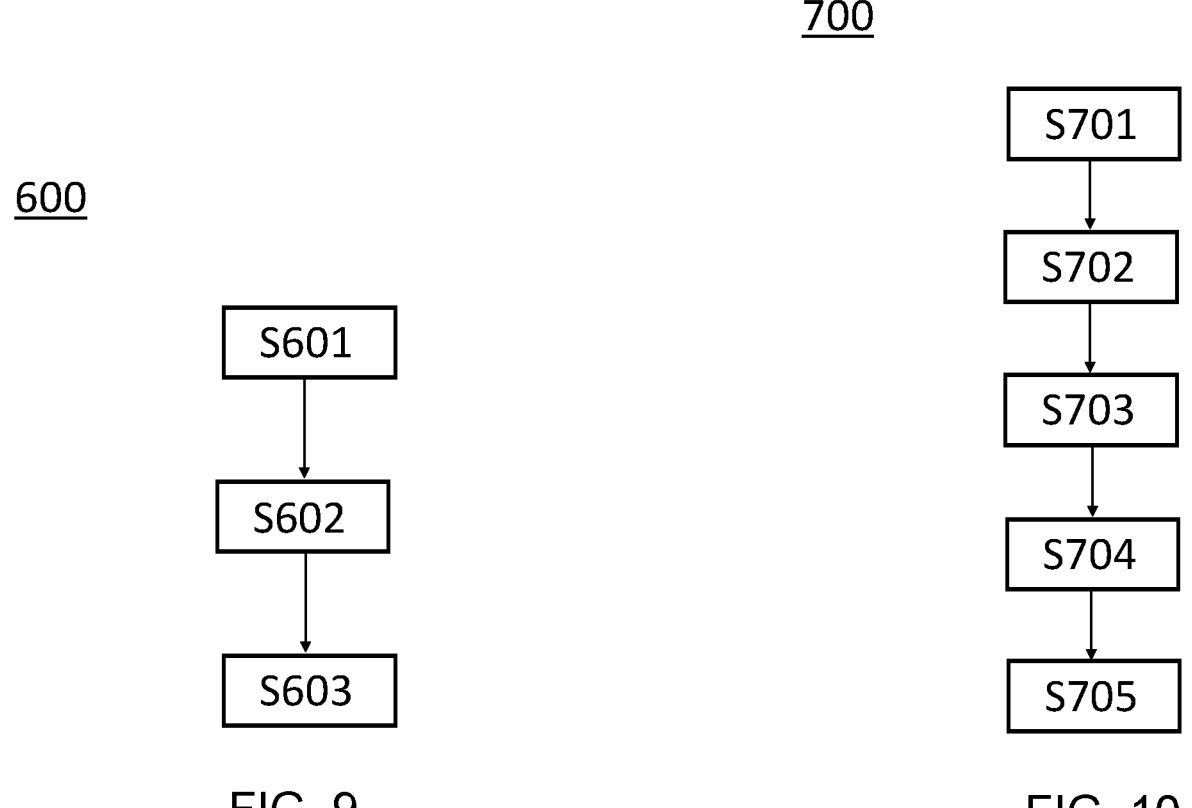
FIG. 9 shows a flow diagram of a method carried out by a coordinator in sending periodic beacons and receiving a signal from the network device for assisting with MAC cycle alignment.
FIG. 10 shows a flow diagram of a method carried out by a coordinator in sending a synchronization message, receiving a signal from the network device for assisting with MAC cycle alignment, and forwarding the signal to a network controller to have centralized control on MAC cycle alignment.

FIG. 9 shows a flow diagram of a method 600 carried out by a coordinator in sending periodic beacons and receiving a signal from the network device for assisting with MAC cycle alignment. In step S601, the coordinator sends periodic beacons at a predefined position in each of its MAC cycles; and in step S602, it receives signals via the out-of-band channel from the network device D1, and wherein the signals are reflected periodic beacons received by the network device D1 from the at least two adjacent coordinators (C1-Cn). In step S603, the coordinator adjusts the start-time of its MAC cycles, following receipt of more than one reflected beacon within a single MAC cycle from the network device D1 for reducing a gap among the more than one reflected beacon.

FIG. 10 shows a flow diagram of a method 700 carried out by a coordinator in sending a synchronization message, receiving a signal from the network device for assisting with MAC cycle alignment, and forwarding the signal to a network controller to have centralized control on MAC cycle alignment. In step S701, the coordinator sends a synchronization message that comprises identification information of the coordinator; and in step S702, the coordinator receives a signal via the out-of-band channel from the network device D1 that is associated to the coordinator C1, and the signal comprises identification information of a neighboring coordinator C2 and a timing offset. The timing offset is derived by the network device D1 and represents a time interval between the time of reception of the synchronization message from a neighboring coordinator C2 as compared to the start-time of the current MAC cycle of the coordinator C1. The method further comprises step S703 that the coordinator forwards the signal received from the network device to a network controller NC via a wired connection. In step S704, the coordinator receives an instruction from the network controller via the wired connection; and the coordinator adjusts the start-time of a MAC cycle according to the instruction received from the network controller in S705.

Figure 11:
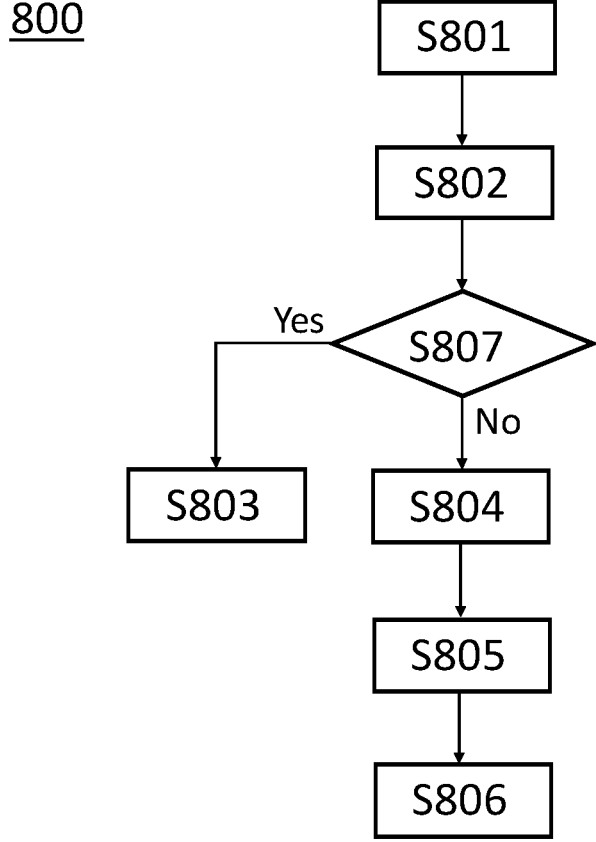
FIG. 11 shows a flow diagram of a method carried out by a coordinator in sending a second type synchronization message, receiving a signal from the network device for assisting with MAC cycle alignment, and determining either to implement the MAC cycle alignment locally or forwarding the signal to a network controller for a centralized control of MAC cycle alignment.

FIG. 11 shows a flow diagram of a method 800 carried out by a coordinator in sending a second type synchronization message, receiving a signal from the network device for assisting with MAC cycle alignment, and determining S807 either to implement the MAC cycle alignment locally or forwarding the signal to a network controller for a centralized control of MAC cycle alignment. In step S801, the coordinator sends a synchronization message, and the synchronization message comprises identification information of the coordinator and a time interval between the transmission of the synchronization message as compared to the start-time of a current MAC cycle. Then in step S802, the coordinator receives a signal via the out-of-band channel from the network device D1 that is associated to the coordinator, and the signal comprises identification information of a neighboring coordinator C2, the time interval comprised in another synchronization message from the neighboring coordinator C2, and a second time interval derived by the network device representing a time interval between the time of reception of the other synchronization message from a neighboring coordinator as compared to the start time of the current MAC cycle of the coordinator. Therefore, the coordinator C1 obtains sufficient information from the network device D1 to get synchronized with its neighboring coordinator C2. The coordinator C1 can choose to implement the MAC cycle alignment locally, or to submit the information further to a central controller, the network controller to have a centralized alignment control on MAC cycles. In case the coordinator C1 opts for the local adjustment, it adjusts the start time of a MAC cycle according to the signal received from the network device in step S803. In case the coordinator C1 opts for the centralized control, in step S804 the coordinator C1 forwards the signal received from the network device to a network controller NC via a wired connection; and receives an instruction from the network controller NC via the wired connection in step S805. According to the instruction received from the network controller NC, the coordinator adjusts the start time of a MAC cycle in step S806. It is also possible that at the network controller NC the decision is made to let the neighboring coordinator C2 to make the adjustment, instead of C1. It is also possible that both C1 and C2 have to make an adjustment. This can happen because of another signal received from another coordinator C3 reporting another alignment needed between C2 and C3, and C3 is the neighbor of C2 but not C1. The benefit of a centralized control on the MAC cycle alignment is that the network controller has a better overview of the overall neighboring information and timing information, and hence, the alignment can be made more efficient.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The invention claimed is:

1. A network device out of a plurality of network devices for reducing interference in an optical wireless communication (OWC) network having a line-of-sight character, the OWC network comprising at least two coordinators and the plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access (TDMA) approach by dividing the wireless medium into consecutive time slots, the network device comprising:

a first receiver configured to detect downlink communication over the OWC network within the first pre-defined spectrum range;

a controller configured to decide on assisting with alignment of Medium Access Control (MAC) cycles between at least two adjacent coordinators, based on the downlink communication from the at least two adjacent coordinators detected by the first receiver;

a second transmitter configured to send a signal comprising timing information related to MAC cycles of the at least two adjacent coordinators, via an out-of-band channel outside the first pre-defined spectrum range, upon the decision on assisting with the alignment of MAC cycles between the at least two adjacent coordinators for interference suppression; wherein the timing information is one of a signal to indicate the start time of individual MAC cycles of the two adjacent coordinators, an offset among individual MAC cycles of the adjacent coordinators, and a start time of MAC cycles of one coordinator out of the adjacent coordinators; and wherein the out-of-band channel has a line-of-sight character.

2. The network device of claim 1, the network device further comprising:

a second receiver configured to detect downlink data on the out-of-band channel; and wherein the decision on assisting with the alignment of MAC cycles between at least two adjacent coordinators, is based on either the downlink communication from the at least two adjacent coordinators detected by the first receiver or the downlink data from the at least two adjacent coordinators detected by the second receiver.

3. The network device of claim 1, wherein the second transmitter is configured to send periodic signals to the at least two adjacent coordinators for use by the at least two adjacent coordinators as timing reference in adjusting their MAC cycles, and wherein the periodic signals indicate a new start-time of MAC cycles according to the timing information related to MAC cycles of the at least two adjacent coordinators.

4. The network device of claim 1, the network device configured to:

detect periodic beacons from the at least two adjacent coordinators by the first receiver over the OWC network, and send signals to the at least two adjacent coordinators by the second transmitter on the out-of-band channel, by reflecting each of the periodic beacons to the at least two adjacent coordinators with a predefined delay following receipt of each of the periodic beacons.

5. The network device according to claim 2, the network device configured to:

detect periodic beacons from the at least two adjacent coordinators by the second receiver on the out-of-band channel, and send signals to the at least two adjacent coordinators by the second transmitter on the out-of-band channel, by reflecting each of the periodic beacons to the at least two adjacent coordinators with a predefined delay following receipt of each of the periodic beacons.

6. The network device of claim 1, the network device associated to a local coordinator out of the at least two adjacent coordinators, and another one out of the at least two adjacent coordinators being a neighboring coordinator of the network device, the network device configured to:

detect synchronization messages from the local coordinator and the neighboring coordinator by the first receiver over the OWC network; and wherein a synchronization message comprises identification information of the individual coordinator;

derive a relative offset by the controller, following receipt of the synchronization message from the neighboring coordinator, and wherein the relative offset is the time interval between the time of reception of the synchronization message from the neighboring coordinator as compared to the start-time of the current MAC cycle of the local coordinator; and send a signal to the local coordinator by the second transmitter on the out-of-band channel, the signal comprising identification information of the neighboring coordinator and the relative offset derived by the network device.

7. The network device according to claim 2, the network device associated to a local coordinator out of the at least two adjacent coordinators, and another one out of the at least two adjacent coordinators being a neighboring coordinator of the network device, the network device configured to:

detect synchronization messages from the local coordinator and the neighboring coordinator by the second receiver on the out-of-band channel; and wherein a synchronization message comprises identification information of the individual coordinator;

derive a relative offset by the controller, following receipt of the synchronization message from the neighboring coordinator, and wherein the relative offset is the time interval between the time of reception of the synchronization message from the neighboring coordinator as compared to the start-time of the current MAC cycle of the local coordinator; and send a signal to the local coordinator by the second transmitter on the out-of-band channel, the signal comprising identification information of the neighboring coordinator and the relative offset derived by the network device.

8. The network device of claim 1, the network device associated to a local coordinator out of the at least two adjacent coordinators, and another one out of the at least two adjacent coordinators being a neighboring coordinator of the network device, the network device configured to:

detect synchronization messages of a second type from the local coordinator and the neighboring coordinator by the first receiver over the OWC network; and wherein a synchronization message of the second type comprises identification information of the respective coordinator transmitting the synchronization message and a time interval between the transmission of the synchronization message as compared to the start-time of a MAC cycle of the respective coordinator;

derive a second time interval by the controller, following receipt of a synchronization message of the second type from the neighboring coordinator, and wherein the second time interval is the time interval between the reception of the synchronization message from the neighboring coordinator as compared to the start-time of the current MAC cycle of the local coordinator; and send a signal to the local coordinator by the second transmitter on the out-of-band channel, and wherein the signal comprises identification information of the neighboring coordinator, the time interval comprised in the synchronization message from the neighboring coordinator, and the second time interval derived by the network device.

9. The network device according to claim 2, the network device associated to a local coordinator out of the at least two adjacent coordinators, and another one out of the at least two adjacent coordinators being a neighboring coordinator of the network device, the network device configured to:

detect synchronization messages of a second type from the local coordinator and the neighboring coordinator by the second receiver on the out-of-band channel; and wherein a synchronization message of the second type comprises identification information of the respective coordinator transmitting the synchronization message and a time interval between the transmission of the synchronization message as compared to the start-time of a MAC cycle of the respective coordinator;

derive a second time interval by the controller, following receipt of a synchronization message of the second type from the neighboring coordinator, and wherein the second time interval is the time interval between the reception of the synchronization message from the neighboring coordinator as compared to the start-time of the current MAC cycle of the local coordinator; and send a signal to the local coordinator by the second transmitter on the out-of-band channel, and wherein the signal comprises identification information of the neighboring coordinator, the time interval comprised in the synchronization message from the neighboring coordinator, and the second time interval derived by the network device.

10. A coordinator out of at least two coordinators for reducing interference in an optical wireless communication (OWC) network having a line-of-sight character, the OWC network comprising the at least two coordinators and a plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access (TDMA) approach by dividing the wireless medium into consecutive time slots, the coordinator comprising:

a first transmitter configured to send out data via downlink communication over the OWC network within the first pre-defined spectrum range;

a second receiver configured to receive a signal from a network device via an out-of-band channel outside the first pre-defined spectrum range, and wherein the signal comprising timing information related to MAC cycles of at least two adjacent coordinators is intended to assist with alignment of MAC cycles between the at least two adjacent coordinators, from which the network device detects downlink communication;

wherein the out-of-band channel has a line-of-sight character.

11. The coordinator of claim 10, the coordinator further comprising:

a second transmitter configured to send downlink data on the out-of-band channel.

12. The coordinator of claim 10, the coordinator further comprising:

a controller configured to adjust a start-time of its MAC cycles according to the signal received from the network device, and wherein a time duration of a MAC cycle is defined by the OWC network, and the start-time of a MAC cycle is a local time reference used by the coordinator to divide the wireless medium into consecutive time slots.

13. The coordinator of claim 10, the coordinator further comprising:

a third transmitter configured to forward the signal received from the network device to a network controller via a wired connection;

a third receiver configured to receive an instruction from the network controller via the wired connection; and a controller configured to adjust a start-time of its MAC cycles according to the instruction received from the network controller, and wherein a time duration of a MAC cycle is defined by the OWC network, and the start-time of a MAC cycle is a local time reference used by the coordinator to divide the wireless medium into consecutive time slots.

14. A method for reducing interference at a network device out of the plurality of network devices in an optical wireless communication (OWC) network having a line-of-sight character, the OWC network comprising at least two coordinators and the plurality of network devices selectively associated to and synchronized with a respective one of the coordinators, and wherein the at least two coordinators and the plurality of network devices share a same optical wireless medium of the OWC network covering a first pre-defined spectrum range via a time-division multiple access (TDMA) approach by dividing the wireless medium into consecutive time slots, the method comprising the network device out of the plurality of network devices:

detecting a downlink communication over the OWC network within the first pre-defined spectrum range;

deciding on assisting with alignment of MAC cycles between at least two adjacent coordinators, based on the detected downlink communication from the at least two adjacent coordinators; and sending a signal comprising timing information related to MAC cycles of the at least two adjacent coordinators via an out-of-band channel outside the first pre-defined spectrum range, upon the decision made by the controller on assisting with the alignment of MAC cycles between the at least two adjacent coordinators for interference suppression; wherein the timing information is one of a signal to indicate the start time of individual MAC cycles of the two adjacent coordinators, an offset among individual MAC cycles of the adjacent coordinators, and start time of MAC cycles of one coordinator out of the adjacent coordinators; and wherein the out-of-band channel has a line-of-sight character.

15. A method for reducing interference at a coordinator out of at least two coordinators in an optical wireless communication (OWC) network having a line-of-sight character, the OWC network comprising the at least two coordinators and a plurality of network devices selectively associated to and synchronized with a respective one of the coordinators, and wherein the at least two coordinators and the plurality of network devices share a same optical wireless medium of the OWC network covering a first predefined spectrum range via a time-division multiple access (TDMA) approach by dividing the wireless medium into consecutive time slots, the method comprising the coordinator out of the at least two coordinators:

sending out data via downlink communication over the OWC network within the first pre-defined spectrum range; and receiving a signal from a network device comprising timing information related to MAC cycles of at least two adjacent coordinators via an out-of-band channel outside the first pre-defined spectrum range, and wherein the signal is intended to assist with alignment of MAC cycles between the at least two adjacent coordinators, from which the network device detects downlink communication;

wherein the out-of-band channel has a line-of-sight character.

16. The method of claim 15, further comprising a coordinator out of the at least two coordinators:

sending periodic beacons at a predefined position in each of its MAC cycles; and receiving signals via the out-of-band channel from the network device, and wherein the signals are reflected periodic beacons received by the network device from the at least two adjacent coordinators; and adjusting the start-time of its MAC cycles, following receipt of more than one reflected beacon within a single MAC cycle from the network device, for reducing a gap among the more than one reflected beacon.

17. The method of claim 15, further comprising a coordinator out of the at least two coordinators:

sending a synchronization message, and wherein the synchronization message comprises identification information of the coordinator; and receiving a signal via the out-of-band channel from the network device that is associated to the coordinator and wherein the signal comprises identification information of a neighboring coordinator and a timing offset, and wherein the timing offset is derived by the network device and represents a time interval between the time of reception of the synchronization message from a neighboring coordinator as compared to the start-time of the current MAC cycle of the coordinator;

forwarding the signal received from the network device to a network controller via a wired connection;

receiving an instruction from the network controller via the wired connection; and adjusting the start-time of a MAC cycle according to the instruction received from the network controller.

18. The method of claim 15, further comprising a coordinator out of the at least two coordinators:

sending a synchronization message, and wherein the synchronization message comprises identification information of the coordinator and a time interval between the transmission of the synchronization message as compared to the start-time of a current MAC cycle; and receiving a signal via the out-of-band channel from the network device that is associated to the coordinator, and wherein the signal comprises identification information of a neighboring coordinator, the time interval comprised in another synchronization message from the neighboring coordinator, and a second time interval derived by the network device representing a time interval between the time of reception of the other synchronization message from a neighboring coordinator as compared to the start time of the current MAC cycle of the coordinator; and the method further comprising either:

adjusting the start time of a MAC cycle according to the signal received from the network device;

or:

forwarding the signal received from the network device to a network controller via a wired connection;

receiving an instruction from the network controller via the wired connection; and adjusting the start time of a MAC cycle according to the instruction received from the network controller.

19. A non-transitory computer readable medium comprising instructions which, when the instructions are executed by a computer, cause the computer to carry out the method of claim 14.

20. A system for reducing interference, the system comprising:

an optical wireless communication (OWC) network with a line-of-sight character comprising at least two coordinators according to claim 13 and a plurality of network devices selectively associated to and synchronized with a respective one of the coordinators, and wherein the at least two coordinators and the plurality of network devices share a same wireless medium of the OWC network via a TDMA approach by dividing the wireless medium into consecutive time slots; and a network device out of the plurality of network devices; and a first coordinator, which the network device is associated to, being one out of the at least two coordinators; and a second coordinator, which is next to the local coordinator, being another one out of the at least two coordinators; and a network controller, which is connected to the first coordinator and the second coordinator via a wired connection; and wherein the network controller is configured to:

receive the signal originated from the network device and forwarded by the first coordinator;

determine an adjustment needed to align the MAC cycles of the first coordinator and the second coordinator, following receipt of the signal; and instruct at least one of the first coordinator or the second coordinator to implement the determined adjustment of the MAC cycles.

* * * * *